(12) United States Patent
Antoni

(10) Patent No.: US 10,560,822 B2
(45) Date of Patent: Feb. 11, 2020

(54) COMMUNICATION DEVICE FOR COMMUNICATION IN A CAR-TO-X COMMUNICATION NETWORK

(71) Applicant: Continental Teves AG & Co. oHG, Frankfurt (DE)

(72) Inventor: Henrik Antoni, Freigericht (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 1 day.

(21) Appl. No.: 16/001,118

(22) Filed: Jun. 6, 2018

(65) Prior Publication Data

US 2018/0359618 A1 Dec. 13, 2018

(30) Foreign Application Priority Data

Jun. 7, 2017 (DE) .......................... 10 2017 209 593

(51) Int. Cl.
| | | |
|---|---|---|
| *H04W 84/18* | (2009.01) | |
| *H04W 4/40* | (2018.01) | |
| *H04B 1/3822* | (2015.01) | |
| *G08G 1/16* | (2006.01) | |
| *H04W 24/08* | (2009.01) | |
| *H04B 1/38* | (2015.01) | |

(52) U.S. Cl.
CPC .............. *H04W 4/40* (2018.02); *G08G 1/163* (2013.01); *H04B 1/3822* (2013.01); *H04W 24/08* (2013.01); *H04B 1/38* (2013.01)

(58) Field of Classification Search
CPC ........ H04W 4/40; H04W 24/08; G08G 1/163; H04B 1/3822; H04B 1/38

USPC ........................................................ 370/310
See application file for complete search history.

(56) References Cited

U.S. PATENT DOCUMENTS

| | | | |
|---|---|---|---|
| 2005/0088318 A1 | 4/2005 | Liu et al. | |
| 2005/0188220 A1* | 8/2005 | Nilsson | ................... H04L 63/04 726/5 |
| 2005/0226201 A1 | 10/2005 | McMillin | |
| 2008/0095163 A1 | 4/2008 | Chen et al. | |
| 2009/0201928 A1 | 8/2009 | Chen et al. | |
| 2010/0254312 A1* | 10/2010 | Kennedy | ............... H04W 40/00 370/328 |
| 2011/0238997 A1* | 9/2011 | Bellur | ................. H04L 63/1458 713/176 |
| 2016/0285935 A1* | 9/2016 | Wu | ......................... H04W 4/90 |

OTHER PUBLICATIONS

German Search Report for German Application No. 10 2017 209 593.8, dated Feb. 7, 2018, with partial translation, 11 pages.

* cited by examiner

*Primary Examiner* — Sai Ming Chan
(74) *Attorney, Agent, or Firm* — RatnerPrestia

(57) ABSTRACT

A communication device for communication in a car-to-X communication network, including a transceiver device, which is configured to emit a first message to a further communication device via the car-to-X communication network, wherein the transceiver device is configured to receive a second message from the further communication device; and a processing device which is configured to process the second message to identify whether the second message contains a version of the first message, and wherein the processing device is further configured to handle the message contained in the second message as confirmation of receipt of the first message by the further communication device.

18 Claims, 2 Drawing Sheets

COMMUNICATION DEVICE FOR COMMUNICATION IN A CAR-TO-X COMMUNICATION NETWORK

CROSS REFERENCE TO RELATED APPLICATIONS

This application is a new U.S. patent application that claims benefit of German Patent Application No. 10 2017 209 593.8, filed Jun. 7, 2017, the disclosure of this application is being incorporated herein by reference in its entirety for all purposes.

FIELD OF THE INVENTION

The present disclosure relates to a communication device for communication in a car-to-X communication network, in particular for communication between vehicles, road infrastructure devices and/or back-end computers.

BACKGROUND OF THE INVENTION

Vehicles which have a communication device may exchange messages with other road users and/or the road infrastructure. These messages may trigger a response on the part of a recipient of the message, for example active modification of vehicle functions and/or a change in the direction and/or speed of the recipient. It may therefore be necessary to protect a communication system, in particular a communication network between vehicles, from malfunction and/or tampering.

In car-to-X communication, a communication device for example of a vehicle is usually able not only to transmit messages originally generated by the communication device but additionally also to re-transmit received messages. The range of the received message may thereby be increased, for example. This method is also known as hopping. To protect the communication device and/or the car-to-X communication network, the communication device may perform a plausibility check of a received message before re-transmitting said message. A plausibility check of the message may for example compare an item of speed and/or position information contained in the message with a restricted speed or position range. Conventional car-to-X communication devices have the disadvantage that they usually discard a message which was originally transmitted by the communication device and which has been re-received thereby due to hopping. This conventional approach is practical, since the re-received message cannot contain any new information. The disadvantage is that no information relating to the messages emitted by the communication device can be available to the communication device.

SUMMARY OF THE INVENTION

An aspect of the present disclosure aims to provide an improved communication device.

The present disclosure is based on the recognition that the above aspect may be achieved by a communication device which can process a message transmitted originally and re-received by the communication device, wherein the communication device received confirmation with receipt of this message that the originally transmitted message has been re-emitted by a further communication device and may be checked by the further communication device.

According to a first aspect, the disclosure relates to a communication device for communication in a car-to-X communication network, comprising a transceiver device, which is configured to emit a first message to a further communication device via the car-to-X communication network, wherein the transceiver device is configured to receive a second message from the further communication device; and a processing device which is configured to process the second message in order to ascertain whether the second message contains a version of the first message, and wherein the processing device is further configured to handle the message contained in the second message as confirmation of receipt of the first message by the further communication device.

Verification and/or the performance of a plausibility check of the first message to be emitted as a check in the emitting communication device may be associated with increased complexity. If an internal verification or plausibility check is not provided, the emitting communication device cannot ascertain whether the transmitted first message is received and processed as a correct message by the receiving further communication device or whether the message is discarded.

Vehicles which have a communication device may exchange messages with other road users and/or the road infrastructure. These messages may trigger a response on the part of a recipient of the message, for example active modification of vehicle functions and/or a change in the direction and/or speed of the recipient. It may therefore be necessary to protect a communication system, in particular a communication network between vehicles, from malfunction and/or tampering.

Verification and/or the performance of a plausibility check of the first message to be emitted as a check in the emitting communication device may be associated with increased complexity. If an internal verification or plausibility check is not provided, the emitting communication device cannot ascertain whether the transmitted first message is received and processed as a correct message by the receiving further communication device or whether the message is discarded.

If part of the first message is erroneous, the first message may be discarded by the further communication device. In the case of erroneous position and/or time information of the communication device, a verification and/or plausibility check of the emitted first message cannot be performed by the communication device and/or an error is not detectable. This may likewise be true of a certificate contained in the message. If the certificate is no longer valid, the transmitting communication device would not use this certificate. Return of the message to be emitted requires the message to be fed into a receive unit, which may be technically complex and/or limit performance.

The communication device according to the disclosure achieves the advantage that messages are received by an external entity, for example the further communication device, and re-emitted thereby if the received message is verified and/or plausible. Since the further communication device may have a different information basis, efficient verification and/or performance of a plausibility check is possible. A message received by the communication device, which was first emitted by the communication device, may be evaluated by the communication device. A conclusion may thereby be drawn about verification and/or performance of a plausibility check by a similar further communication device. The message may be performed efficiently through the further communication device compared with verification and/or a plausibility check in the communication device.

Processing of information relating to other vehicles, which are in particular received via a car-to-X message, may result in the advantage that, in addition to conventional, onboard sensors, information which is more remote, for example outside the field of vision of the driver of the vehicle. This information may for instance be provided to the driver to enable earlier adaptation of the vehicle driving situation than would be possible solely on the basis of the onboard sensors and/or driver perception.

As a result of the safety-relevance of the messages transmitted between vehicles, it may be necessary to provide special safeguards and/or verification therefor.

The way in which the authenticity of a message is checked and in particular the format of the message are described for example in technical specification ETSI 103 097, which is incorporated by reference.

In one embodiment, the transceiver device is configured to prevent re-emission of the first message to the further communication device if the second message contains a version of the first message which forms a receipt confirmation for the first message.

In this way, the advantage is achieved that erroneous messages in particular cannot be further disseminated via the car-to-X communication network. In particular, a device's own messages are not re-transmitted, to prevent a message from multiplying the use of resources by being transmitted and received repeatedly between at least two transceiver devices without the information content being increased.

In one embodiment, the version of the first message is a copy of the first message, and the processing device is configured to compare the second message with the first message in order to ascertain whether the second message contains the copy of the first message.

In one embodiment, the first message includes speed information, time information and/or position information relating to the communication device.

In one embodiment, the second message includes speed information, time information and/or position information relating to the further communication device.

Messages which are exchanged between the communication device of a first vehicle and the further communication device of a further vehicle may communicate the driving situation of the respective vehicle to the respective other vehicle. This may in particular be used to adapt the driving situation of at least one of the vehicles and/or to provide the driver with information about one of the vehicles. For example, a vehicle may automatically adapt its speed or change lanes to avoid a hazardous situation, in particular a collision between the vehicles.

Furthermore, the message may comprise sensor data from the vehicle, in order to communicate information about the wider surroundings of the vehicle. In addition to speed and position, the movement trajectory and/or intended changes to the movement trajectory, for example a turning-off operation, may moreover be exchanged by way of the messages. This information may also include direct interaction between vehicles, for example through a collision and/or collision avoidance. The authenticity of the messages generated may be needed for example for recording and subsequent analysis of the messages.

In one embodiment, the processing device is configured to perform a plausibility check of the second message on the basis of the speed information, the time information and/or the position information, wherein the second message is transmitted by the transceiver device if the plausibility check yields a positive result.

The communication device may perform a plurality of plausibility checks, wherein the results of the plurality of plausibility checks may be different, in particular may have undergone a Boolean operation. An individual negative result of one plausibility check from the plurality of plausibility checks may for example lead to a negative decision as result information from the plurality of plausibility checks (AND function of the plausibility checks).

The authenticity of a message may be checked by a plausibility check of the message by the communication device prior to initial transmission of the message. It is, however, possible for such a plausibility check to generate a result which is generated from a further result of a further plausibility check of a further communication device, for example a recipient of the message. The result of the plausibility check may be dependent on the information available to the transmitter. Furthermore, the further result of the further plausibility check may be dependent on the information available to the recipient. In this way, a message which is identified by the communication device as plausible may be identified as implausible by the further communication device. This may depend on the information base of the respective communication devices. By processing the received message, the communication device may have at least two results of a plausibility check, if the communication device itself undertakes a plausibility check of the message.

The communication device of a recipient may perform a plausibility check of a message. The plausibility check of a message may be dependent on the information contained in the message and provided to the communication device of the recipient. This information relates in particular to the driving situation of the vehicle: speed, acceleration, position, and/or distance from surrounding vehicles. The plausibility check may be performed fuzzily and/or non-fuzzily, wherein a non-fuzzy plausibility check defines precise information correspondence and a fuzzy plausibility check defines a possible information range. The plausibility check may generate a binary result, wherein the plausibility check provides either a positive decision or a negative decision as result information.

In one embodiment, the processing device is configured to generate a status message if the plausibility check of the second message yields a negative result, which status message is transmitted by the transceiver device to a central message processing device.

The central message processing system may in particular be a back-end system, which documents the negative result of the plausibility check and/or initiates measures for preventing further subsequent negative results of the plausibility check. The communication device may in particular be requested by the central message processing system to obtain a new certificate. Furthermore, the central message processing system may be configured to transmit information to the communication device and/or an interconnected entity. This interconnected entity may be configured to recognize an identical error in a plurality of communication devices and to initiate further actions in response thereto.

In one embodiment, the second message contains an error message which informs the communication device about the emission of an implausible first message by the communication device.

In one embodiment, the processing device is configured to modify the first message in relation to the error message, in order to generate a corrected first message which is transmitted by the transceiver device.

In one embodiment, the second message has a certificate and the processing device is configured to check the validity of the certificate, wherein the second message is transmitted by the transceiver device if the second message has a valid certificate.

One possible way of protecting the message is to transmit a certificate in the message, so guaranteeing the authenticity of the message. The respective certificate may for example be checked by the further communication device in a recipient, in order to recognize the communication device as an authorized message transmitter. These certificates may authenticate the message and/or the transmitting communication device while simultaneously anonymizing the transmitting communication device. This may further be achieved in particular by cyclically changing the confidentially generated certificates.

In one embodiment, the certificate is pseudonymizable to conceal the identity of the further communication device in the second message.

In this way, the advantage is achieved that the communication device of the transmitter may transmit messages anonymously and at the same time be identified as an authenticated transmitter by the communication device of the recipient. The certificates may be generated confidentially. In this way, data protection requirements may in particular be met.

Pseudonymization, in particular anonymization, of the certificate may prevent the identity of the transmitter from being established. The certificate from an in particular unauthenticatable message may be resolved by the public key infrastructure (PKI) and a message thus transmitted for example to the manufacturer and/or supplier of the communication device and/or of the vehicle. The manufacturer and/or supplier may then take measures to stop further emission of the messages identified as unauthenticatable.

Furthermore, the communication device may be included in a revocation list, such that the certificate used by the communication device may be marked as canceled. The communication device may moreover obtain further certificates, in particular pseudonym certificates from the PKI.

In one embodiment, the first message and/or the second message each have a count value and the processing device is configured to increase the count value of the second message on re-transmission of the second message.

In one embodiment, the processing device is configured to prevent re-transmission of the second message by the transceiver unit if the count value of the second message exceeds a count limit value.

This achieves the advantage that the range of a message may be limited. It may be advantageous, in particular in a car-to-X communication network, for the messages received by a communication device to be limited to messages which have been transmitted by further communication devices in the immediate surroundings of the communication device. Since each communication device may have a limited range, the range of a message may be efficiently restricted by the number of instances of forwarding of said message. Furthermore, time-limited validity of the message may in this way also be achieved, since each instance of forwarding takes up a specific amount of time for processing by the respective communication device. In this way, the product of forwarding time and count limit value may form a lifetime for the message.

According to a second aspect, the disclosure relates to a communication method for communication in a car-to-X communication network, comprising
emission of a first message by the communication device to a further communication device;
receipt of the first message by the further communication device;
transmission of a second message by the further communication device, which second message contains a version of the first message;
receipt of the second message by the communication device;
processing of the second message by the communication device to ascertain whether the second message contains a version of the first message.

In one embodiment, the further communication device, after receipt of the first message, performs verification of the first message and prevents transmission of the second message if the result of the verification is negative.

BRIEF DESCRIPTION OF THE DRAWINGS

Further exemplary embodiments are explained with reference to the appended figures, in which.

DETAILED DESCRIPTION OF THE PREFERRED EMBODIMENTS

Figure 1:
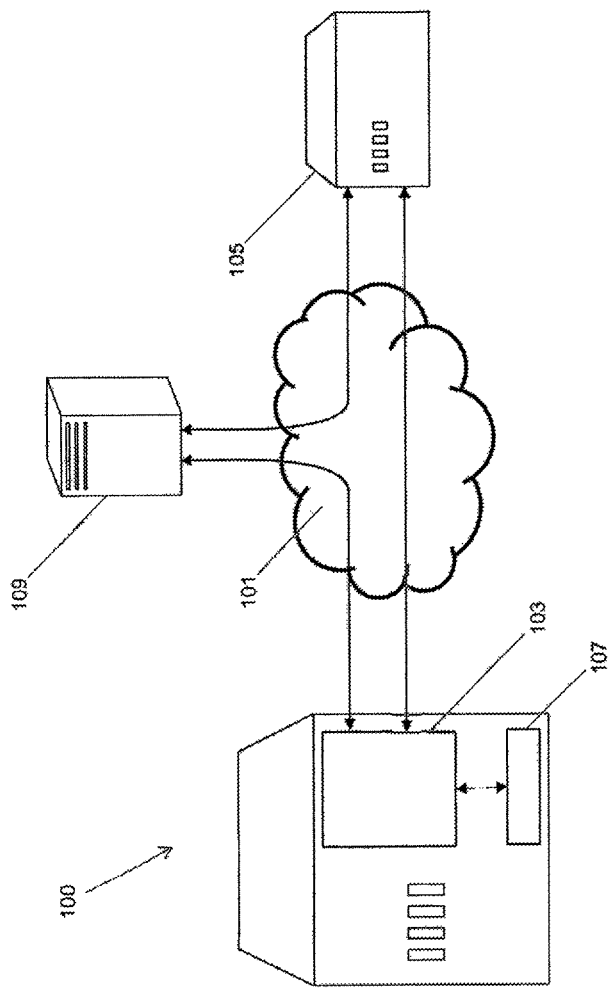
FIG. 1 shows a communication device according to one embodiment.

FIG. 1 shows a schematic diagram of a communication device 100 for communication in a car-to-X communication network 101, comprising a transceiver device 103 which is configured to emit a first message to a further communication device 105 via the car-to-X communication network 101, wherein the transceiver device 103 is configured to receive a second message from the further communication device 105. The communication device 100 furthermore has a processing device 107 which is configured to process the second message to ascertain whether the second message contains a version of the first message, and wherein the processing device 107 is further configured to handle the message contained in the second message as confirmation of receipt of the first message by the further communication device 105.

The version of the first message may be a copy of the first message and the processing device 107 may be configured to compare the second message with the first message to ascertain whether the second message contains the copy of the first message. The copy of the first message may form a receipt confirmation of the originally emitted message for the communication device 100.

The processing device 107 may be configured to perform a plausibility check of the second message on the basis of the speed information, time information and/or position information contained in the second message. If the plausibility check generates a positive result, the second message may be re-transmitted by the transceiver device 103.

If the plausibility check of the second message generates a negative result, the processing device 107 may generate a status message which is transmitted by the transceiver device 103 to a central message processing device 109. The status message may inform the central message processing device 109 about the negative result of the plausibility check of the second message.

The central message processing device 109 may transmit a second message on the basis of the status message, which second message has an error message. The second message with the error message may in particular be received by the communication device 100. The communication device 100 may be informed by the error message about the emission of an implausible first message. If the first message contains a certificate, the error message may further inform the communication device 100 about failed authentication of the first message in the further communication device 105 on the basis of an invalid certificate.

The communication device 100 may modify the first message in relation to the error message, in order to generate a corrected first message which is transmitted by the transceiver device 103. Successful correction of the first message may for example be confirmed by receipt of a second message containing a copy of the first message.

The processing device 107 may be configured to check the validity of the certificate contained in the second message, wherein the second message is transmitted by the transceiver device 103 if the second message has a valid certificate.

The first message and/or the second message may each have a count value, wherein the processing device 107 is configured to increase the count value of the second message on re-transmission of the second message. The processing device 107 may be configured to prevent re-transmission of the second message by the transceiver unit 103 if the count value of the second message exceeds a count limit value. This advantageously makes it possible to prevent a message which is distributed via a plurality of communication devices 100 by hopping from being received and re-transmitted repeatedly by a number of the plurality of communication devices 100.

The first and/or second message may have a pseudonymized certificate, such that the identity of the original transmitter of the first and/or second message may be concealed.

The car-to-X communication network 101 may in particular be a radio network which allows wireless exchange of messages. The communication device 100 and/or the further communication device 105 may communicate with one another directly or via relays. In particular, a message of the communication device 100 may be transmitted to the further communication device 105 via a plurality of communication devices 100.

The communication device 100 may be fixedly installed in a vehicle and in particular coupled with further control devices of the vehicle in order to transmit messages with vehicle sensor data. These sensor data for example comprise information about distance from surrounding objects and/or vehicles, airbag trigger information, weather data, such as precipitation, brightness, temperature and/or wind speed, status information relating to the lighting system, in particular lights which are on and/or hazard warning lights, speed, acceleration, position and/or antilock braking system status information.

The communication device 100 may be connected detachably to the vehicle and/or be a mobile electronic device, in particular a mobile telephone. In this way, the communication networks with which the mobile telephone is connected may be used for exchanging messages between vehicles and/or other road users.

Figure 2:
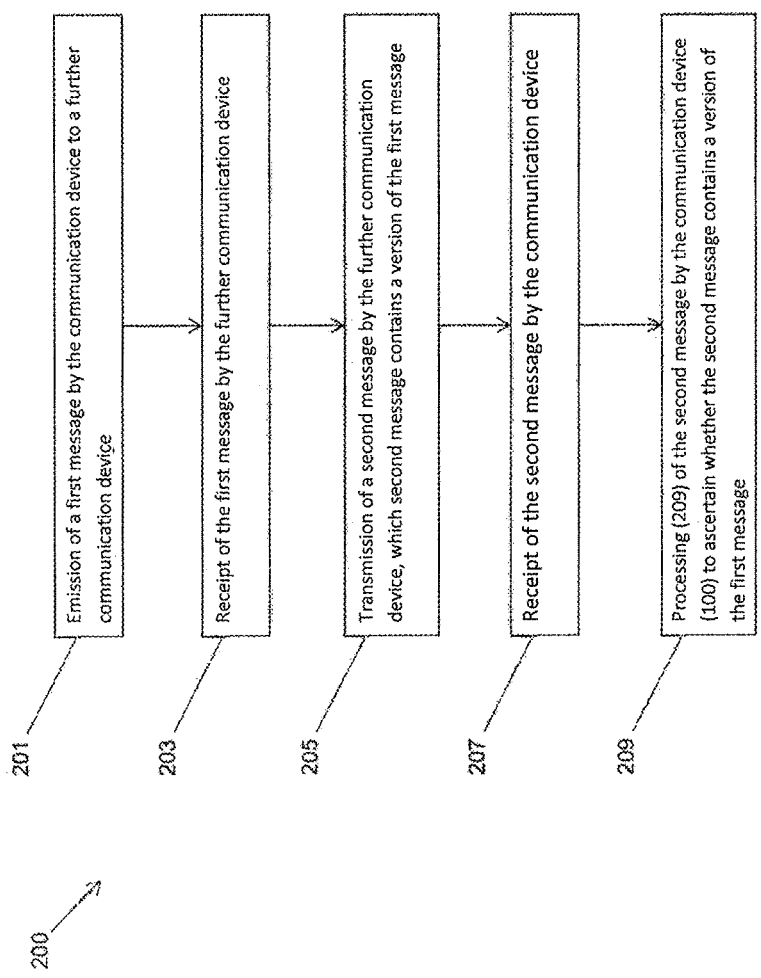
FIG. 2 shows a communication method according to one embodiment.

FIG. 2 shows a schematic diagram of a communication method 200 for communications in a car-to-X communication network 101, with emission 201 of a first message by the communication device 100 to a further communication device 105; receipt 203 of the first, message by the further communication device 105; transmission 205 of a second message by the further communication device 105, which second message contains a version of the first message; receipt 207 of the second message by the communication device 100; processing 209 of the second message by the communication device 100 to ascertain whether the second message contains a version of the first message.

Re-emission 201 of the first message to the further communication device 107 may be prevented by the transceiver device if the second message contains a version of the first message as receipt confirmation.

The further communication device 105 may be a copy of the communication device 100 and/or have the same functions as the communication device 100. The certificate of each message may thus be verified prior to emission 201 and/or the information in each message checked for plausibility. If the communication device 100 receives a message which was originally transmitted by the communication device 100, the content of the message has been recognized as plausible by the further communication device 105 and/or the certificate of the message and/or of the communication device 100 has been recognized as valid.

On receipt 207 of the second message containing a version of the first message, the communication device 100 may recognize that the originally emitted message is correct. The second message with the copy of the first message accordingly forms a receipt confirmation, which in particular refers to the correctness of the previously transmitted first message. The first message was checked in the reference system of the further communication device 105. The result of checking of the certificate and the information in the message may therefore be dependent on the information available to the further communication device 105.

LIST OF REFERENCE NUMERALS

100 Communication device
101 Car-to-X communication network
103 Transceiver device
105 Further communication device
107 Processing device
109 Central message processing device
200 Communication method
201 Emission
203 Receipt
205 Transmission
207 Receipt
209 Processing

The invention claimed is:

1. A communication device for communication in a car-to-X communication network, comprising:
   a transceiver device, which is configured to:
      emit a first message to a further communication device via the car-to-X communication network, and
      receive a second message from the further communication device; and
   a processing device, which is configured to:
      compare the second message to the first message to identify whether the second message contains a version of the first message, and
      confirm that the further communication device has received the first message when the comparison indicates that the second message contains the version of the first message.

2. The communication device according to claim 1, wherein the transceiver device is configured to prevent re-emission of the first message to the further communication device if the second message contains a version of the first message which forms a receipt confirmation for the first message.

3. The communication device according to claim 1, wherein the version of the first message is a copy of the first message, and wherein the processing device is configured to compare the second message with the first message in order to ascertain whether the second message contains the copy of the first message.

4. The communication device according to claim 1, wherein the first message includes speed information, time information and/or position information relating to the communication device.

5. The communication device according to claim 1, wherein the second message includes speed information, time information and/or position information relating to the further communication device.

6. The communication device according to claim 5, wherein the processing device is configured to perform a plausibility check of the second message on the basis of the speed information, the time information and/or the position information, wherein the second message is transmitted by the transceiver device if the plausibility check yields a positive result.

7. The communication device according to claim 6, wherein the processing device is configured to generate a status message if the plausibility check of the second message yields a negative result, which status message is transmitted by the transceiver device to a central message processing device.

8. The communication device according to claim 1, wherein the second message contains an error message which informs the communication device about the emission of an implausible first message by the communication device.

9. The communication device according to claim 8, wherein the processing device is configured to modify the first message in relation to the error message, in order to generate a corrected first message which is transmitted by the transceiver device.

10. The communication device according to claim 1, wherein the second message has a certificate and the processing device is configured to check the validity of the certificate, wherein the second message is transmitted by the transceiver device if the second message has a valid certificate.

11. The communication device according to claim 10, wherein the certificate is pseudonymizable to conceal the identity of the further communication device in the second message.

12. The communication device according to claim 1, wherein the first message and/or the second message each have a count value and wherein the processing device is configured to increase the count value of the second message on re-transmission of the second message.

13. The communication device according to claim 12, wherein the processing device is configured to prevent re-transmission of the second message by the transceiver unit if the count value of the second message exceeds a count limit value.

14. A communication method for communication in a car-to-X communication network, comprising
emitting a first message by the communication device to a further communication device;
receiving the first message by the further communication device;
transmitting a second message by the further communication device, which second message contains a version of the first message;
receiving the second message by the communication device;
compare the second message to the first message by the communication device to ascertain whether the second message contains a version of the first message; and
confirm that the further communication device has received the first message when the comparison indicates that the second message contains the version of the first message.

15. The communication method according to claim 14, wherein the further communication device, after receipt of the first message, performs verification of the first message and prevents transmission of the second message if the result of the verification is negative.

16. The communication device according to claim 2, wherein the version of the first message is a copy of the first message, and wherein the processing device is configured to compare the second message with the first message in order to ascertain whether the second message contains the copy of the first message.

17. A communication device for communication in a car-to-X communication network, comprising:
a transceiver device, which is configured to emit a first message to a further communication device via the car-to-X communication network, and receive a second message from the further communication device; and
a processing device, which is configured to compare the second message to the first message to identify whether the second message contains a version of the first message, and confirm that the further communication device has received the first message when the comparison indicates that the second message contains the version of the first message,
wherein the second message includes speed information, time information and/or position information relating to the further communication device, and
wherein the processing device is configured to perform a plausibility check of the second message on the basis of the speed information, the time information and/or the position information, wherein the second message is transmitted by the transceiver device if the plausibility check yields a positive result.

18. A communication device for communication in a car-to-X communication network, comprising:
a transceiver device, which is configured to emit a first message to a further communication device via the car-to-X communication network, and receive a second message from the further communication device; and
a processing device, which is configured to compare the second message to the first message to identify whether the second message contains a version of the first message, and confirm that the further communication device has received the first message when the comparison indicates that the second message contains the version of the first message,
wherein the second message contains an error message which informs the communication device about the emission of an implausible first message by the communication device.

* * * * *